United States Patent
Chou et al.

(10) Patent No.: US 10,275,356 B2
(45) Date of Patent: Apr. 30, 2019

(54) COMPONENT CARRIER WITH CONVERTER BOARD

(71) Applicant: Quanta Computer Inc., Taoyuan (TW)

(72) Inventors: Le-Sheng Chou, Taoyuan (TW); Sz-Chin Shih, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 143 days.

(21) Appl. No.: 14/965,975

(22) Filed: Dec. 11, 2015

(65) Prior Publication Data

US 2017/0168943 A1   Jun. 15, 2017

(51) Int. Cl.
| | |
|---|---|
| *G06F 12/02* | (2006.01) |
| *G06F 12/08* | (2016.01) |
| *G06F 12/12* | (2016.01) |
| *G06F 13/16* | (2006.01) |
| *G06F 13/40* | (2006.01) |
| *G06F 13/42* | (2006.01) |
| *G06F 1/18* | (2006.01) |
| *H01R 12/70* | (2011.01) |
| *H01R 12/72* | (2011.01) |

(Continued)

(52) U.S. Cl.
CPC .......... *G06F 12/0833* (2013.01); *G06F 1/185* (2013.01); *G06F 1/187* (2013.01); *G06F 12/0246* (2013.01); *G06F 12/128* (2013.01); *G06F 13/1673* (2013.01); *G06F 13/4022* (2013.01); *G06F 13/4291* (2013.01); *H01R 12/7076* (2013.01); *H01R 12/72* (2013.01); *H01R 24/20* (2013.01); *H01R 24/28* (2013.01); *G06F 12/12* (2013.01); *G06F 2212/621* (2013.01); *G06F 2212/7206* (2013.01)

(58) Field of Classification Search
None
See application file for complete search history.

(56) References Cited

U.S. PATENT DOCUMENTS

| | | | |
|---|---|---|---|
| 9,588,565 B1 * | 3/2017 | Harland | G06F 1/28 |
| 2008/0288798 A1 * | 11/2008 | Cooper | G06F 1/3228 |
| | | | 713/322 |

(Continued)

FOREIGN PATENT DOCUMENTS

| | | |
|---|---|---|
| CN | 101176254 A | 5/2008 |
| CN | 102124527 A | 7/2011 |

(Continued)

OTHER PUBLICATIONS

Maxim ("2.5Gbps PCI Express Passive Switches", Rev 0, May 2007, pp. 1-16).*

(Continued)

*Primary Examiner* — Farley Abad
*Assistant Examiner* — Dayton Lewis-Taylor
(74) *Attorney, Agent, or Firm* — Nixon Peabody LLP; Zhou Lu

(57) ABSTRACT

A component carrier with a housing and a converter board disposed within the housing. The converter board including a U.2 connector, an M.2 connector configured to receive an M.2 solid state drive having a cache memory, and a capacitor. The capacitor provides backup power for a power loss protection system allowing flush cache storage. The housing configured to receive one or more M.2 solid state drives coupled with the converter board.

12 Claims, 5 Drawing Sheets

(51) Int. Cl.
  *H01R 24/20* (2011.01)
  *H01R 24/28* (2011.01)
  *G06F 12/0831* (2016.01)
  *G06F 12/128* (2016.01)

(56) References Cited

U.S. PATENT DOCUMENTS

2016/0259754 A1* 9/2016 Ping ................... G06F 3/0688
2017/0010808 A1* 1/2017 Jacobs ................. G06F 3/061

FOREIGN PATENT DOCUMENTS

TW        M479541 U    6/2014
TW        I479309 B     4/2015
WO    WO 2015126383 A1 * 8/2015 ............. G06F 13/00

OTHER PUBLICATIONS

Taiwanese Office Action for Application No. 105106443, dated Mar. 30, 2017, w/ First Office Action Summary.
Taiwanese Search Report for Application No. 105106443, dated Mar. 30, 2017.

\* cited by examiner

COMPONENT CARRIER WITH CONVERTER BOARD

FIELD

The subject matter herein generally relates to a solid state drive carrier. More specifically, the subject matter herein relates to a solid state drive carrier configured to convert an M.2 (previously known as Next Generation Form Factor (NGFF)) solid state drive to work with a U.2 connector (previously known as SFF-8639).

BACKGROUND

M.2 (previously known as Next Generation Form Factor (NGFF)) solid state drives are a main storage device within enterprise and data center systems. M.2 can support either serial AT attachment (SATA) or peripheral component interconnect express (PCIe) with lower power consumption, cost, and high performance. M.2 fails to support hot-plug and power loss protection (PLP).

BRIEF DESCRIPTION OF THE DRAWINGS

Implementations of the present technology will now be described, by way of example only, with reference to the attached figures, wherein.

DETAILED DESCRIPTION

Figure 1:
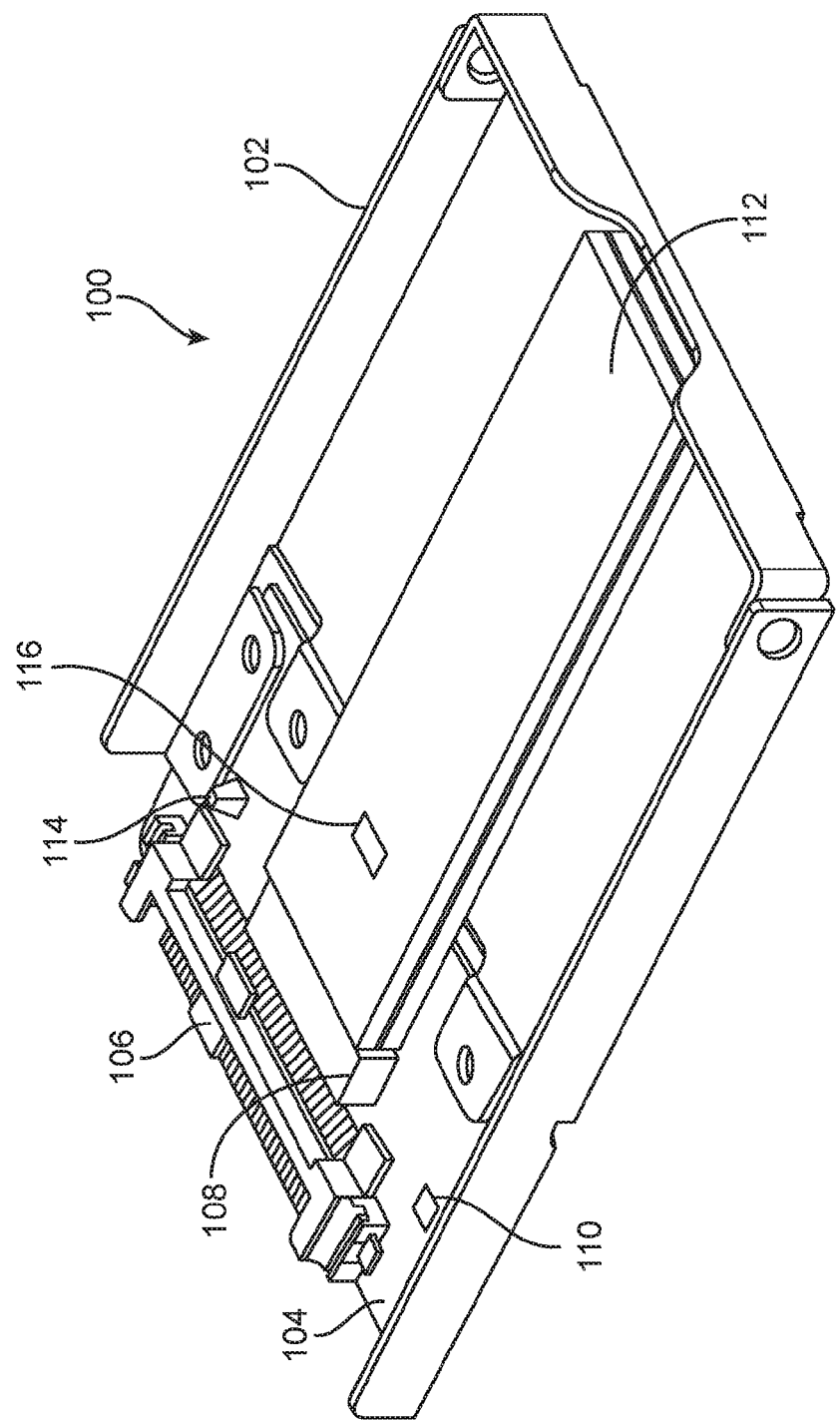
FIG. 1 is an isometric view of an example embodiment of a component carrier with a converter board in accordance with the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is focused on a component carrier capable implementing one or more M.2 solid state drives with a U.2 connector. M.2 solid state drives have become a main storage solution within enterprise and data center systems because it can support both Serial AT Attachment (SATA) and Peripheral Connected Interface Express (PCIe) interfaces with lower power consumption and high performance benefit. The U.2 connector is generally configured to receive Non-Volatile Memory Express (NVMe) type-PCIe type solid state drives which permit hot-plug and power loss protection (PLP). M.2 solid state drives are much more cost effective compared with NVMe type-PCIe solid state drives. The present disclosure focuses on a component carrier allowing an M.2 solid state drive to be implemented with a U.2 connector providing the cost effectiveness of a M.2 solid state drive with the favorable features of a U.2 connection system.

The component carrier includes a converter board to couple the M.2 solid state drives with the U.2 connector. The converter board has a PCIe clock buffer to generate two clock sources to support up to two M.2 solid state drives. The converter board also includes at least one capacitor to provide backup power for M.2 solid state drive flush cache storage. The component carrier and converter board can allow implementation of the M.2 solid state drive with the U.2 connector benefits of hot-plug and power loss protection (PLP) thereby improving cost effectiveness and serviceability in the event of an M.2 solid state drive failure.

The present disclosure describes a component carrier forming a housing and a converter board disposed within the housing. The converter board having a U.2 connector, a PCIe clock buffer, at least one M.2 connector configured to receive an M.2 solid state drive, and a capacitor. The PCIe clock buffer configured to generate two clock sources for the M.2 solid state drive and the capacitor provides backup power for M.2 solid state drive flush cache storage, and the housing is configured to receive one or more M.2 solid state drives coupled with the converter board.

FIG. 1 illustrates an example embodiment of a component carrier in accordance with the present disclosure. The component carrier 100 includes a housing 102. The housing 102 receives a converter board 104 therein. The converter board 104 includes a U.2 connector 106 (formerly known as SFF-8639) to couple the component carrier 100 to an electronic device (not shown). The electronic device can be a computer, a server, a rack mount server, a blade server, or any other electronic device capable of receiving a U.2 connected component. The converter board 104 has an M.2 connector 108 (formerly known as Next Generation Form Factor). The M.2 connector 108 can receive a M.2 compatible component, such as an M.2 solid state drive 112. The converter board 104 electronically couples the U.2 connector 106 with the M.2 connector 108 allowing the use of M.2 components with U.2 connectors 106 and related systems. Specifically, the M.2 solid state drive 112 has lower power consumption and higher performance compared with a typical U.2 component, such as a NVMe type PCI-e SSD.

The converter board 104 can also include a Peripheral Component Interconnect Express (PCIe) clock buffer 110.

The PCIe clock buffer 110 can generate two clock sources for the M.2 solid state drive 112. The PCIe clock buffer 110 allows the converter board 104 to support one or more M.2 components within a single component carrier 100. (See FIGS. 3-4). The U.2 connector 106 has four PCIe communication channels (lanes), thus allowing two M.2 solid state drive 112 to be implemented with one U.2 connector 106. Each M.2 solid state drive 112 couples with two of the four respective PCIe communication channels.

The converter board 104 also has one or more capacitors 114 disposed thereon to assist with power management. The one or more capacitors 114 capable of providing backup power for the M.2 solid state drive 112 in the event of power interruption. The one or more capacitors 114 allow the implementation of power loss protection with an M.2 solid state drive 114. Power loss protection is a feature available with the U.2 connector 106 and NVMe type PCI-e solid state drives but not standard M.2 solid state drives 112. The converter board 104 and one or more capacitors provide enables an M.2 solid state drive 112 to have power loss protection while maintaining the performance and cost benefits of an M.2 component. Power loss protection utilizes the power stored in the one or more capacitors 114 to implement a Flush Cache command upon power interruption. The Flush Cache command transfers any data in the M.2 solid state drive cache 116 to memory that does not require power, such as NAND memory.

The converter board 104 implementing the M.2 solid state drive 112 with a U.2 connector 106 also provides support for hot-plug. Hot-plug refers to accessing, servicing, or replacing components without powering down the electronic device. Hot-plug is a feature available via U.2 connectors 106 and NVMe type PCI-e solid state drives, but not standard M.2 solid state drives 112.

Figure 2:
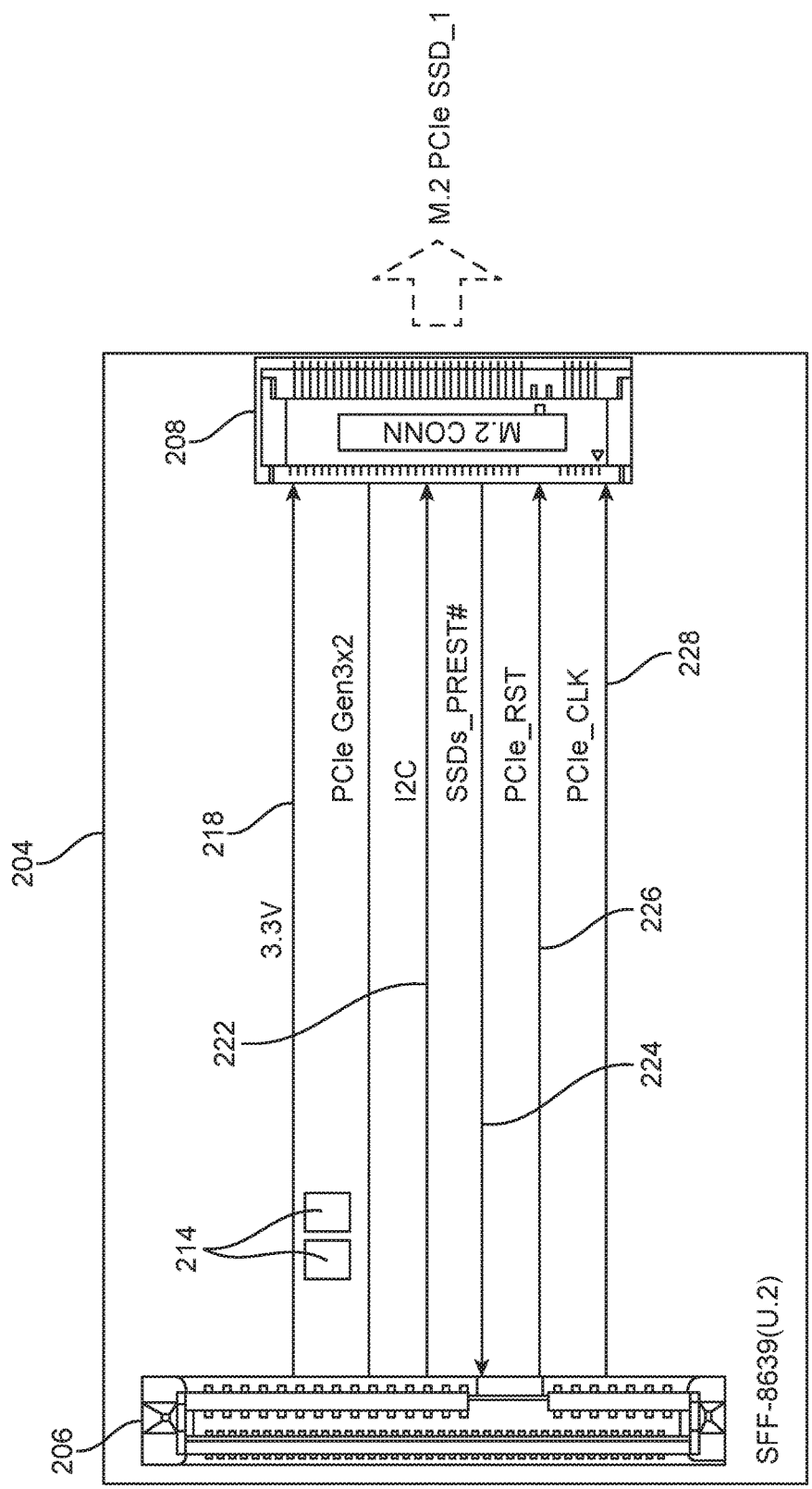
FIG. 2 is a diagrammatic view of an example embodiment of a converter board in accordance with the present disclosure.

FIG. 2 illustrates an example embodiment of a converter board according to the present disclosure. The converter board 204 can be a printed circuit board, ribbon board, flexible circuit board, bread board, or any other known circuitry. As can be appreciated in FIG. 2, the appropriate pins of the U.2 connector 206 are coupled with the corresponding pins of the M.2 connector 208. A power circuit 218 couples an appropriate pin of the U.2 connector 206 with the corresponding pin of the M.2 connector 208. The power circuit 218 is coupled with the two capacitors 214. In other embodiments, the power circuit 218 can include one, or more than two capacitors 214. The power circuit 218 carries 3.3 volts from the U.2 connector 206 to the M.2 connector 208. In other embodiments, more or less voltage can be carried in the power circuit 218, such as 1.5 volts or 5 volts.

The converter board 204 also includes an I2C circuit 222 allowing communication from the U.2 connector 206 to the M.2 connector 208, an SSDs_PREST# circuit 224 and PCIe_RST circuit 226 allowing communication from the M.2 connector 208 to the U.2 connector 206, and a PCIe_CLK circuit 228 sending a clock source from the U.2 connector 206 to the M.2 connector 208.

Figure 3:
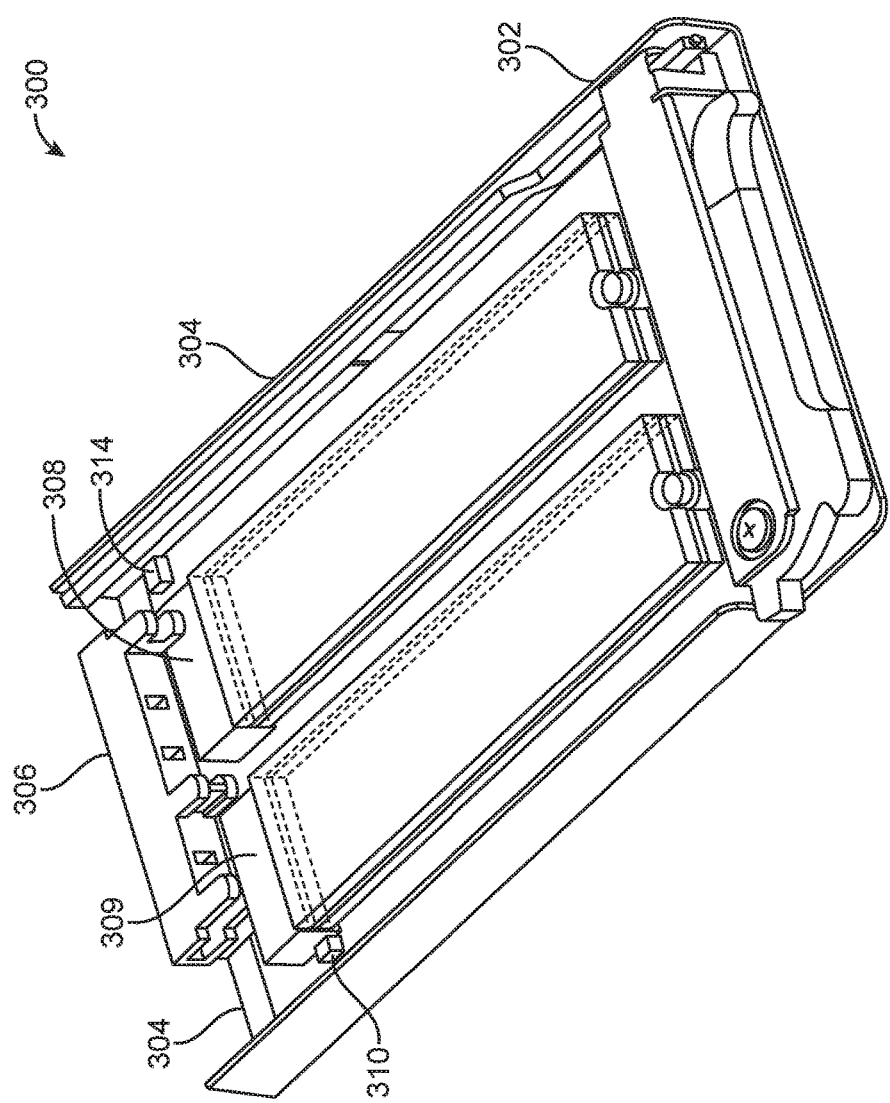
FIG. 3 is an isometric view of a second example embodiment of a component carrier with a converter board in accordance with the present disclosure.

FIG. 3 illustrates a second example embodiment of a component carrier in accordance with the present disclosure. The component carrier 300 includes a housing 302. The housing 302 receives a converter board 304 therein. The converter board 304 includes a U.2 connector 306 (formerly known as SFF-8639) to couple the component carrier 300 to an electronic device (not shown). The electronic device can be a computer, a server, a rack mount server, a blade server, or any other electronic device capable of receiving a U.2 connected component. The converter board 304 has two M.2 connectors 308, 309 (formerly known as Next Generation Form Factor). The M.2 connector 308 can receive an M.2 compatible component, such as an M.2 solid state drive. The converter board 304 electronically couples the U.2 connector 306 with the M.2 connector 308 allowing the use of M.2 components with U.2 connectors 306 and related systems. Specifically, the M.2 solid state drive has lower power consumption and higher performance compared with a typical U.2 component, such as a NVMe type PCI-e SSD.

The converter board 304 also includes a Peripheral Component Interconnect Express (PCIe) clock buffer 310. The PCIe clock buffer 310 can generate two clock sources for the two M.2 solid state drives. The PCIe clock buffer 310 allows the converter board 304 to support the M.2 component within a single component carrier 300 with each M.2 solid state drive receiving one clock source.

The U.2 connector 306 has four PCIe communication channels (lanes), thus allowing two M.2 solid state drive to be implemented with one U.2 connector 306. Each M.2 solid state drive coupled with two of the four respective PCIe communication channels.

The converter board 304 also has one or more capacitors 314 disposed thereon to assist with power management. The one or more capacitors 314 capable of providing backup power for the M.2 solid state drives in the event of power interruption. The one or more capacitors 314 allow the implementation of power loss protection with an M.2 solid state drive 314. Power loss protection is a feature available with the U.2 connector 306 and NVMe type PCI-e solid state drives but not standard M.2 solid state drives. The converter board 304 and one or more capacitors provide enables an M.2 solid state drive to have power loss protection while maintaining the performance and cost benefits of an M.2 component. Power loss protection utilizes the power stored in the one or more capacitors 314 to implement a Flush Cache command upon power interruption. The Flush Cache command transfers any data in the M.2 solid state drive cache 316 to memory that does not require power, such as NAND memory.

The converter board 304 implementing the M.2 solid state drives with a U.2 connector 306 also provides support for hot-plug. Hot-plug refers to accessing, servicing, or replacing components without powering down the electronic device. Hot-plug is a feature available via U.2 connectors 306 and NVMe type PCI-e solid state drives, but not standard M.2 solid state drives.

Figure 4:
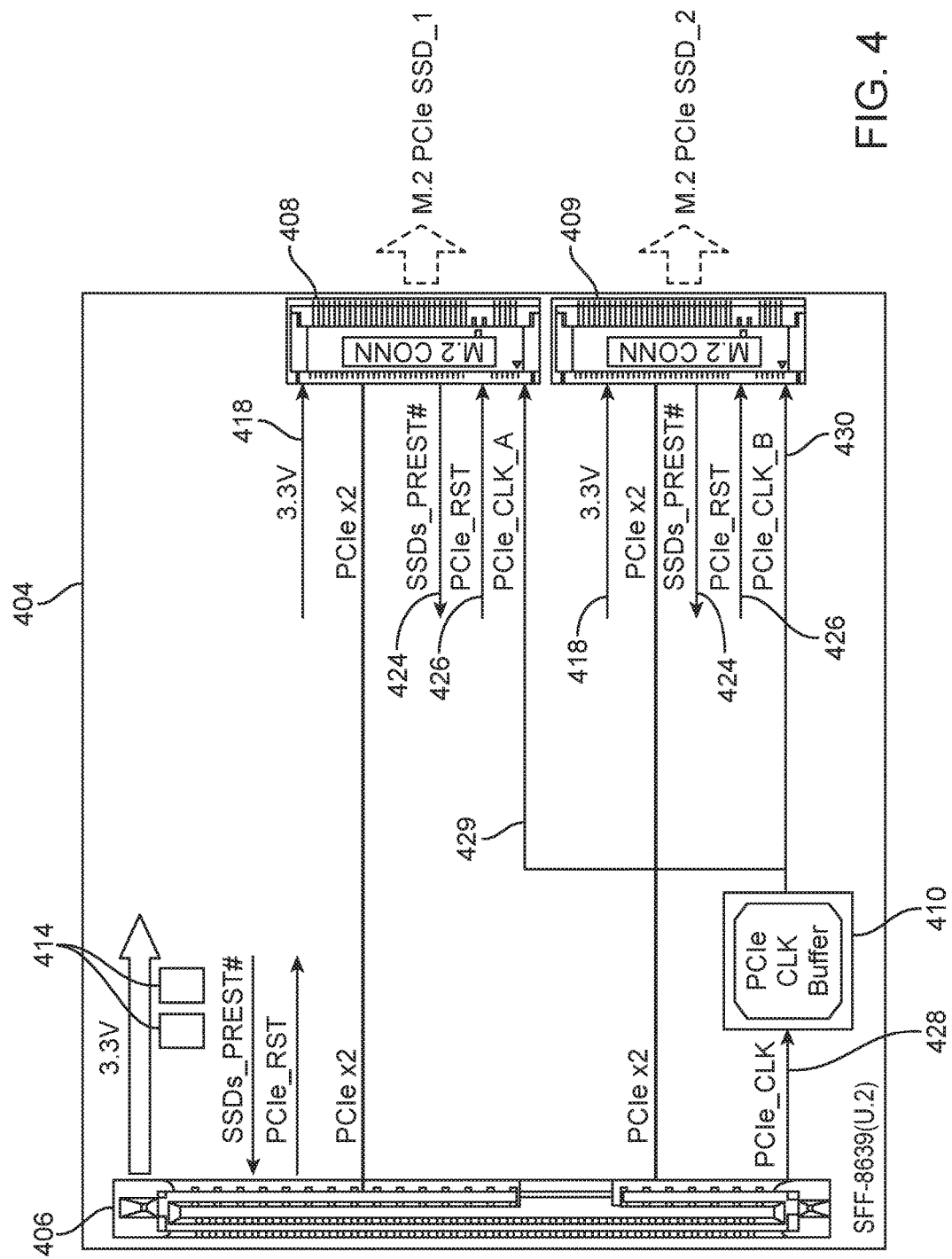
FIG. 4 is a diagrammatic view of a second example embodiment of a converter board in accordance with the present disclosure.

FIG. 4 illustrates a second example embodiment of a converter board according to the present disclosure. The converter board 404 can be a printed circuit board, ribbon board, flexible circuit board, bread board, or any other known circuitry. As can be appreciated in FIG. 4, the appropriate pins of the U.2 connector 406 are coupled with the corresponding pins of the M.2 connectors 408, 409. A power circuit 418 couples an appropriate pin of the U.2 connector 406 with the corresponding pin of the M.2 connectors 408, 409. The power circuit 418 is coupled with the two capacitors 414. In other embodiments, the power circuit 418 can include one, or more than two capacitors 414. The power circuit 418 carries 3.3 volts from the U.2 connector 406 to each of the M.2 connectors 408, 409. In other embodiments, more or less voltage can be carried in the power circuit 418, such as 1.5 volts or 5 volts.

The converter board 404 also includes an SSDs_PREST# circuit 424 and PCIe_RST circuit 426 allowing communication from the M.2 connectors 408, 409 to the U.2 connector 406, and the PCIe_CLK circuit 428 sending a clock source from the clock buffer (PCIe CLK Buffer) 410 to each of M.2 connector 408, 409.

As can be appreciated in FIG. 4, the PCIe_CLK circuit 428 includes a PCIe_CLK_A sending a first clock source from the clock buffer 410 to M.2 connector 408 and a PCIe_CLK_B sending a second clock source from the clock buffer 410 to the M.2 connector 409. Each M.2 connector 408, 409 receives a separate clock source from the clock buffer, thus allowing the component carrier 300 to support more than one M.2 solid state drive (shown in FIG. 3).

Figure 5:
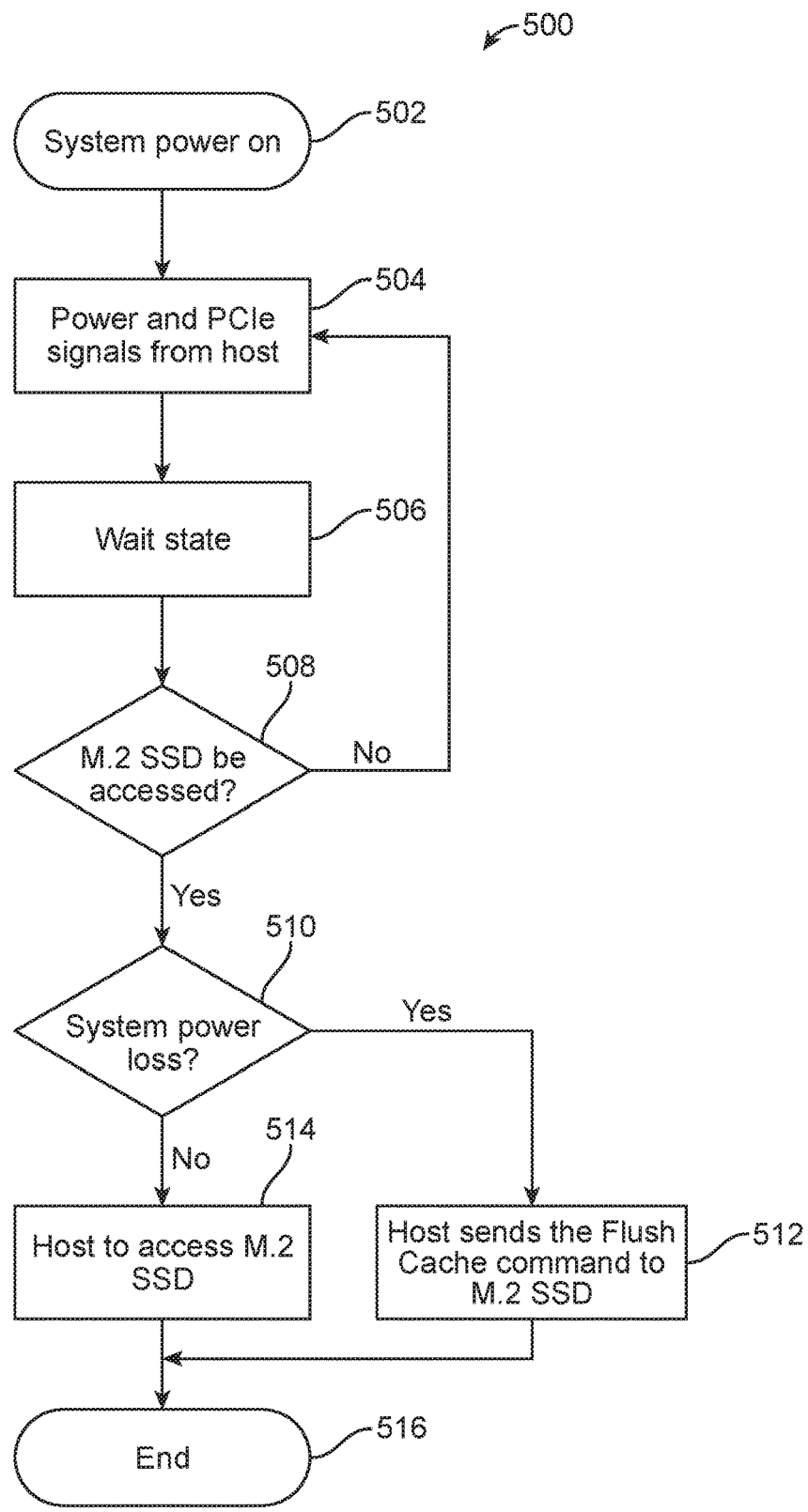
FIG. 5 is a flowchart of a component access method.

Referring to FIG. 5, a flowchart is presented in accordance with an example embodiment. The example method 500 is provided by way of example, as there are a variety of ways to carry out the method 500. The method 500 described below can be carried out using the configurations illustrated in FIGS. 1-4, for example, and various elements of these figures are referenced in explaining example method 500. Each block shown in FIG. 5 represents one or more processes, methods or subroutines, carried out in the example method 500. Furthermore, the illustrated order of blocks is illustrative only and the order of the blocks can change according to the present disclosure. Additional blocks may be added or fewer blocks may be utilized, without departing from this disclosure. The example method 500 can begin at block 502.

At block 502, a system including a M.2 solid state drive 112 and a converter board 104 powers on. The method 500 can then proceed to block 504.

At block 504, power and PCIe signals are sent from a host to the system. The method 500 can then proceed to block 506.

At block 506, the system waits for a response to the power and PCIe signals sent from the host to the system. The method 500 can then proceed to block 508.

At block 508, the system determines whether the M.2 solid state drive 112 can be accessed. If the M.2 solid state drive 112 cannot be accessed, the method 500 returns to block 504. If the M.2 solid state drive 112 can be accessed, the method 500 proceeds to block 510.

At block 510, the system determines whether a power loss exists. If power loss exists, the method 500 proceeds to block 512. If no power loss exits, the method 500 proceeds to block 514.

At block 512, the host sends a Flush Cache command to the M.2 solid state drive 112. The M.2 solid state drive flushes, or clears, the M.2 solid state drive cache memory and moves the data to the memory that does not require power to retain data, such as NAND memory. Cache memory loses its stored data upon power loss, and thus the method 500 determines whether a power loss exists so as to implement a Flush Cache command to prevent data loss. The component carrier 100 can utilize power from the one or more capacitors 114 to implement the Flush Cache command during a power loss. The method 500 proceeds to block 516.

At block 514, the host accesses the M.2 solid state drive 112. The method 500 proceeds to block 516.

At block 516, the method 500 ends.

It is believed the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiments of the disclosure.

What is claimed is:

1. A component carrier comprising:
    a housing;
    a converter board disposed within the housing, the converter board comprising:
        a U.2 connector;
        an M.2 connector configured to receive an M.2 solid state drive having a cache memory, two or more pins of the M.2 connector being connected to corresponding pins of the U.2 connector via a power circuit, wherein the M.2 solid state drive flush cache storage transfers data from the cache memory to a non-volatile memory; and
        a capacitor, wherein the capacitor provides backup power for power loss protection, the power loss protection allowing flush cache storage, and wherein the housing is configured to receive an M.2 solid state drive coupled with the converter board.

2. The component carrier of claim 1, wherein the converter board comprises a first M.2 connector configured to receive a first M.2 solid state drive, a second M.2 connector configured to receive second M.2 solid state drive, and a PCIe clock buffer capable of generating two clock sources, one for each of the first M.2 solid state drive and the second M.2 solid state drive.

3. The component carrier of claim 1, wherein the converter board has two capacitors configured to provide backup power.

4. The component carrier of claim 1, wherein the non-volatile memory is NAND memory.

5. The component carrier of claim 1, wherein the M.2 solid state drive is hot-swappable from the converter board.

6. The component carrier of claim 1, wherein the power circuit carries a predetermined voltage from the U.2 connector to the M.2 connector.

7. A converter board comprising:
    a U.2 connector;
    an M.2 connector configured to receive an M.2 solid state drive having a cache memory, two or more pins of the M.2 connector being connected to corresponding pins of the U.2 connector via a power circuit, wherein the M.2 solid state drive flush cache storage transfers data from the cache memory to a non-volatile memory; and
    a capacitor, wherein the capacitor provides backup power for power loss protection, the power loss protection allowing flush cache storage, and wherein the housing is configured to receive one or more M.2 solid state drives coupled with the converter board.

8. The converter board of claim 7, further comprising two M.2 connectors, each configured to receive an M.2 solid state drive and a PCIe clock buffer capable of generating two clock sources, one for each of the two M.2 solid state drives.

9. The converter board of claim 8, further comprising has two capacitors configured to provide backup power.

10. The converter board of claim 7, wherein the non-volatile memory is NAND memory.

11. The converter board of claim 7, wherein the M.2 solid state drive is hot-swappable from the converter board.

12. A method for flushing cache, the method comprising:
    sending power and a PCIe signal from a host to an M.2 solid state drive, the host having a capacitor and the M.2 solid state drive having a cache memory, the M.2 solid state drive connected to an M.2 connector of a converter board, two or more pins of the M.2 connector being connected to corresponding pins of a U.2 connector of the converter board via a power circuit;
    determining whether the host has a power loss; and
    when a power loss is detected:
        sending a flush cache command to the M.2 solid state drive;

drawing power to the M.2 solid state drive draws from the capacitor; and transferring data stored in the cache memory to a non-volatile memory.

\* \* \* \* \*